United States Patent Office 3,743,634
Patented July 3, 1973

3,743,634
2-DEOXYSTREPTAMINE DERIVATIVE AND
ACID-ADDITION SALTS
Peter W. K. Woo, Detroit, Mich., assignor to Parke,
Davis & Company, Detroit, Mich.
No Drawing. Filed May 14, 1971, Ser. No. 143,620
Int. Cl. C07c 129/18
U.S. Cl. 260—210 S    5 Claims

ABSTRACT OF THE DISCLOSURE $N^1$-(4-amino - 2 - hydroxybutyryl)-4-O-(2,6-diamino-2,6-dideoxy-D-glucopyranosyl) - 2 - deoxystreptamine and acid-addition salts. These compounds have a wide spectrum of antibacterial activity. They can be produced by acidic treatment of $N^1$-(4-amino-2-hydroxybutyryl)-4-O-(2,6-diamino - 2,6 - dideoxy-D-glucopyranosyl)-5-O-D-xylofuranosyl-2-deoxystreptamine or $N^1$-(4-amino-2-hydroxybutyryl) - 4-O-(2,6 - diamino-2,6-dideoxy-D-glucopyranosyl)-5-O-D-ribofuranosyl-2-deoxystreptamine.

SUMMARY AND DETAILED DESCRIPTION

The present invention relates to new chemical compounds. More particularly, it relates to $N^1$-(4-amino-2-hydroxybutyryl)-4-O-(2,6-diamino - 2,6 - dideoxy-D-glucopyranosyl)-2-deoxystreptamine having in free base form the formula

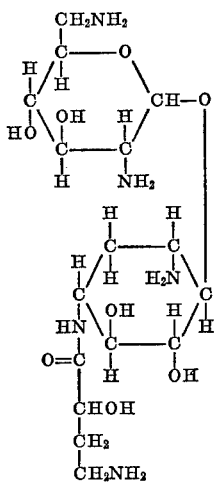

and to acid-addition salts thereof.

In U.S. Pat. 3,541,078 there is a disclosure of a chemical product at that time called ambutyrosin (as well as its individual components ambutyrosin A and ambutyrosin B). At the present time, these substances are more commonly called butirosin (and individual components butirosin A and butirosin B) and the latter terminology is sometimes used herein. In free base form butirosin A has the chemical structure $N^1$-(4-amino-2-hydroxybutyryl)-4-O-(2,6-diamino - 2,6 - dideoxy-D-glucopyranosyl)-5-O-D-xylofuranosyl-2-deoxystreptamine. In free base form butirosin B has the chemical structure $N^1$-(4-amino-2-hydroxybutyryl) - 4 - O - (2,6-diamino-2,6-dideoxy-D-glucopyranosyl) - 5 - O - D - ribofuranosyl-2-deoxystreptamine. Butirosin A and butirosin B are known in both free base and acid-addition salt forms.

In accordance with the invention, $N^1$-(4-amino-2-hydroxybutyryl)-4-O-(2,6-diamino-2,6-dideoxy- - D - glucopyranosyl)-2-deoxystreptamine and its acid-addition salts can be produced by reacting butirosin A or butirosin B (or a mixture of butirosin A and butirosin B) with an acid. $N^1$ - (4-amino - 2 - hydroxybutyryl)-4-O-(2,6 - diamino - 2,6 - dideoxy-D-glucopyranosyl) - 2 - deoxystreptamine is obtained by acid treatment of either butirosin A or butirosin B and thus it is relatively unimportant whether butirosin A, butirosin B, or the more readily available mixture is used as starting material. Since the reaction is carried out under acidic conditions, the butirosin starting material is present in the form of an acid-addition salt. Some examples of suitable acidic agents are aqueous solutions of mineral acids such as hydrochloric acid, hydrobromic acid, phosphoric acid, or sulfuric acid; aqueous solutions of organic acids such as trichloroacetic acid, p-toluenesulfonic acid, or methanesulfonic acid; or an acidic cation exchange resin in the free acid form. If desired, an organic solvent such as a lower alkanol or a lower alkanoic acid can also be present. In some cases, the treatment with acid is carried out in an organic solvent such as methanol or acetic acid containing no more than a trace amount of water; anhydrous conditions can also be used. A preferred acidic agent is aqueous hydrochloric acid, or hydrogen bromide in acetic acid. The amount of acidic agent used should be sufficient to maintain distinctly acidic conditions in the reaction mixture. Since the acidic treatment of butirosin in aqueous medium can result in the production of any of a number of dissimilar hydrolysis products, the time and temperature of reaction and the pH are selected in such a way as to give a good yield of $N^1$-(4-amino-2-hydroxybutyryl)-4-O-(2,6-diamino - 2,6 - dideoxy-D-glucopyranosyl)-2-deoxystreptamine. In general, the reaction is carried out at a temperature between about —10 and 125° C. or the reflux temperature of the mixture for from 10 minutes to 24 hours at a pH not in excess of 4.0. However, in order to get a satisfactory yield of the desired product, the time, temperature, and pH must be selected so that they bear the proper relationship to each other. The preferred pH is 2 or lower. When a hydrolysis is carried out in 0.1 N hydrochloric acid (pH about 1), it is customary to heat the reaction mixture at reflux for about 10 hours. When a hydrolysis is carried out under more strongly acidic conditions, it is customary to use a lower temperature for a shorter reaction time. Other specific reaction conditions are illustrated in greater detail hereinafter. The reaction mixture can contain not only $N^1$-(4 - amino - 2 - hydroxybutyryl)-4-O-(2,6-diamino - 2,6 - dideoxy-D-glucopyranosyl) - 2 - deoxystreptamine but also unreacted butirosin and other hydrolysis products such as neamine, neosamine C, and deoxystreptamine. The desired product can be separated by any of a number of procedures well known in organic chemistry such as selective adsorption on and elution from a cation exchange resin, or chromatography using the glass column or thin-layer techniques. In all cases the product can be isolated either as the free base or as an acid-addition salt by adjustment of the pH as required. The product isolated directly from acidic medium is an acid-addition salt. The free base is isolated following treatment with a base. The compounds of the invention can exist in anhydrous form as well as in solvated, including hydrated, forms. In general, the hydrated forms and the solvated forms with pharmaceutically-acceptable solvents are equivalent to the anhydrous or unsolvated form for the puposes of the invention.

The free base of the invention forms acid-addition salts with any of a variety of inorganic and organic acids. Pharmaceutically - acceptable acid-addition salts are formed with such acids as hydrochloric, hydrobromic, sulfuric, phosphoric, acetic, succinic, citric, maleic, malic, and pamoic acids. The free base and the acid-addition salt forms are interconvertible by adjustment of the pH. They differ in solubility properties but in general are otherwise equivalent for the purposes of the invention.

$N^1$ - (4 - amino - 2-hydroxybutyryl)-4-O-(2,6-diamino-2,6 - dideoxy-D-glucopyranosyl)-2-deoxystreptamine and its acid-addition salts are antibacterial agents having a wide spectrum of antibacterial activity. The antibacterial activity against representative microorganisms is given in the following table. In this table, the in vitro antibacterial activity is expressed in terms of the minimal inhibitory concentration, measured as micrograms of free base equivalent per ml. of medium, against various species of bacteria. The data reported in the table were obtained using commonly encountered strains of the designated organisms. Where more than a single strain of an organism is indicated, the range of minimal inhibitory concentrations is given for the purpose of illustrating the variability observed for different strains of the single species.

| Microorganism | Number of strains | Minimal inhibitory concentration, micrograms base/ml. |
|---|---|---|
| Proteus mirabilis | 2 | 25–100 |
| Proteus vulgaris | 2 | 50–100 |
| Pseudomonas aeruginosa | 3 | 12.5–25 |
| Salmonella typhimurium | 1 | 100 |
| Shigella sonnei | 1 | 200 |
| Escherichia coli | 1 | 50 |
| Aerobacter aerogenes | 1 | 50 |
| Klebsiella pneumoniae | 1 | 25 |
| Staphylococcus aureus | 2 | 12.5–50 |

In the cases of one strain of Pseudomonas aeruginosa and one strain of Staphylococcus aureus not included in the above table, the minimal inhibitory concentration was determined as >200 micrograms base/ml.

Against most bacteria, $N^1$-(4-amino-2-hydroxybutyryl)-4 - O - (2,6-diamino-2,6-dideoxy-D-glucopyranosyl)-2-deoxystreptamine has antibacterial activity either comparable to or somewhat less than the activity of butirosin. However, a surprising finding of the invention is that against some strains of Pseudomonas aeruginosa, $N^1$-(4-amino - 2 - hydroxybutyryl)-4-O-(2,6-diamino-2,6-dideoxy - D - glucopyranosyl)-2-deoxystreptamine has antibacterial activity comparable to or even greater than the activity of butirosin. Thus, the compounds of the invention are of value for their antibacterial activity generally and their activity against Pseudomonas aeruginosa in particular. They can be administered either orally, parenterally, or topically.

Because of their wide antibacterial spectrum and bactericidal as well as bacteriostatic activity, the compounds of the invention are also useful as antibacterial agents in in vitro applications such as sterilizing laboratory instruments and surfaces, sterilizing pharmaceutical products, and maintaining sterile conditions during pharmaceutical manufacturing operations. For sterilizing laboratory instruments and surfaces and similar in vitro applications, the compounds can be used in the form of a 0.1 to 1.0% aqueous solution.

The invention is illustrated by the following examples.

EXAMPLE 1

A solution of 60.4 g. of butirosin sulfate in 3.0 liters of 0.1 N hydrochloric acid is heated at reflux for 10 hours and then cooled to 0–5° C. The solution is adjusted to pH 6.4 by stirring it with a weak anion exchange resin in the hydroxyl form. A resin such as IR–45 can be used. The resin is removed by filtration and washed with 3.4 liters of water. The filtrate and washings are combined and passed, during a period of 17.5 hours, through a 4.3 cm. outside diameter glass column containing 680 ml. of weak cation exchange resin in the ammonium form. A resin such as IRC–50 can be used. The column is washed slowly with 5.5 liters of water and then with 13 liters of 0.1 M aqueous ammonia. These washings are discarded. The column is then eluted at a rate of 2 liters per hour with aqueous ammonia of increasing concentrations as follows: 0.15 M (4 liters), 0.25 M (12 liters), 0.35 M (6 liters), and 0.50 M (10 liters). The effluent is collected in one-liter portions beginning with the addition of the 0.15 M aqueous ammonia. The effluent fractions containing $N^1$ - (4-amino-2-hydroxybutyryl)-4-O-(2,6-diamino - 2,6 - dideoxy-D-glucopyranosyl)-2-deoxystreptamine are combined for isolation of product. The combination of fractions can be based on an analysis of each fraction or on experience acquired over a period of time. According to one method of analysis, each fraction is analyzed by thin-layer chromatography using a silica gel support. A support such as Gelman ITLC SG can be used. The chromatogram is developed twice in the solvent system chloroform-methanol-28% aqueous 15 N ammonia-water in the respective ratios of 80:120:30:10 (by volume). The products are identified by a 15-minute contact with an agar plate prepared with beef extract and peptone and seeded with Bacillus subtilis ATCC 6633. An agar such as Difco mycin assay agar can be used; "Difco Manual of Dehydrated Culture Media and Reagents for Microbiological and Clinical Laboratory Procedures," ninth edition. Incubation of the plates at 37° C. reveals zones of inhibition of microbial growth due to neamine (Rf about 0.60) and $N^1$-(4-amino-2-hydroxybutyryl)-4-O - (2,6 - diamino - 2,6 - dideoxy-D-glucopyranosyl)-2-deoxystreptamine (Rf about 0.19). In a typical procedure (beginning with 0.15 M aqueous ammonia, as described above) fractions 2 through 5 contain a small amount of neamine; fractions 6 through 14 contain a mixture of neamine and $N^1$ - (4-amino-2-hydroxybutyryl)-4-O-(2,6-diamino - 2,6 - dideoxy - D - glucopyranosyl)2-deoxystreptamine; and fractions 15 through 30 contain essentially only $N^1$ - (4 - amino-2-hydroxybutyryl)-4-O-(2,6-diamino - 2,6 - dideoxy - D-glucopyranosyl)-2-deoxystreptamine. Fractions 15 through 30 are combined, evaporated at reduced pressure at a temperature below 25° C. to a small volume, and freeze-dried. The residue is further dried in vacuo at room temperature for 25 hours to give $N^1$ - (4 - amino - 2 - hydroxybutyryl)-4-O-(2,6-diamino-2,6 - dideoxy-D-glucopyranosyl)-2-deoxystreptamine dihydrate. The melting point behavior is difficult to reproduce. In a representative determination a sample softens and shrinks at 128° C.; liquefies and decomposes at 184° C. The specific rotations $[\alpha]^{25}$ (1% in water) at various wavelengths are as follows: $+56.5°$ at 589 millimicrons; $+58.5°$ at 578 millimicrons; $+65.8°$ at 546 millimicrons; $+105.2°$ at 436 millimicrons; and $+152.0°$ at 365 millimicrons.

Most of the water of hydration is removed by drying in vacuo at 100° C. for 24 hours. The anhydrous compound is obtained by drying in vacuo at 100° C. for 24 hours and then at 138° C. for 30 minutes. The melting point behavior is difficult to reproduce. In a representative determination a sample softens and shrinks at 142° C.; liquefies and decomposes at 176° C.

A tetraacetyl derivative is obtained by adding 2.1 ml. of methanol and then 1.2 ml. of acetic anhydride to a cold solution of 71.2 mg. of $N^1$-(4-amino-2-hydroxybutyryl)-4-O-(2,6-diamino - 2,6 - dideoxy-D-glucopyranosyl)-2-deoxystreptamine in 0.9 ml. of water. The reaction mixture is allowed to stand at room temperature overnight and then evaporated in vacuo almost to dryness. Methanol is added and the product that crystallizes is collected on a filter, washed with ether, and dried. For further purification, the product can be recrystallized from aqueous ethanol. It is the tetraacetyl derivative (hydrated) of $N^1$-(4-amino-2-hydroxybutyryl) - 4 - O - (2,6-diamino-2,6-dideoxy-D-glucopyranosyl) - 2 - deoxystreptamine in which an acetyl group has been introduced on each primary amino group; M.P. 279–289° C. with decomposition.

EXAMPLE 2

The $N^1$-(4-amino - 2 - hydroxybutyryl)-4-O-(2,6-diamino-2,6-dideoxy-D-glucopyranosyl) - 2 - deoxystreptamine, as described in Example 1, is obtained by following any of the following alternate procedures. In each case the product is separated from any other materials which may be present, such as unreacted butirosin or small amounts of neamine. It is isolated either as the free base or as an acid-addition salt by adjustment of the pH.

(a) A 3.5 ml. aqueous solution of 10 mg. of butirosin is adjusted to pH 1.98 with hydrochloric acid and heated at reflux for 48 hours.

(b) A 3.5 ml. aqueous solution of 10 mg. of butirosin is adjusted to pH 2.5 with hydrochloric acid and heated at reflux for 88 hours.

(c) A 3.5 ml. aqueous solution of 10 mg. of butirosin is adjusted to pH 3.3 with hydrochloric acid and heated at reflux for 88 hours. In this case the yield of the desired product is relatively small.

(d) A 2.5 ml. aqueous solution of 10 mg. of butirosin is treated with 1.18 ml. of 0.2 N p-toluenesulfonic acid and heated at reflux for 12.5 hours.

(e) A 1.5 ml. aqueous solution of 30 mg. of butirosin is treated with 1 ml. of a strongly acidic cation exchange resin in the free acid form. A resin such as Dowex 50 x 8W can be used. The mixture is stirred and heated at 80° C. for 30 minutes. The resin is collected and washed with 1 M aqueous ammonia. The washings are evaporated to dryness under reduced pressure to give a residue containing the desired product.

(f) A solution of 207.4 mg. of butirosin sulfate in 10 ml. of 0.04 N hydrochloric acid is heated at reflux for 35 hours.

EXAMPLE 3

A solution of 0.5 g. of butirosin in 3.5 ml. of glacial acetic acid is added to 5 ml. of 30% hydrogen bromide in acetic acid at 0° C. A precipitate begins to form quickly. The mixture is allowed to stand at 0° C. for 2.5 hours and then diluted with ethyl acetate. The insoluble product is collected on a filter, washed with ethyl acetate and with ether, and dried at reduced pressure. It is $N^1$-(4-amino-2-hydroxybutyryl)-4-O-(2,6 - diamino-2,6 - dideoxy-D-glucopyranosyl)-2-deoxystreptamine tetrahydrobromide: $[\alpha]_D^{25}$ (1% in water) = +39°.

EXAMPLE 4

With vigorous stirring at 0° C., 2.01 ml. of 1 N sulfuric acid and then 42 ml. of absolute ethanol are added to a solution of 177.5 mg. of $N^1$-(4-amino - 2 - hydroxybutyryl)-4-O-(2,6 - diamino - 2,6 - dideoxy - D - glucopyranosyl)-2-deoxystreptamine dihydrate in 1.97 ml. of water. When separation of the insoluble product is complete it is collected by centrifugation and mixed with 1.6 ml. of water and 0.05 ml. of 1 N sulfuric acid. The mixture is diluted with 32 ml. of cold absolute ethanol and stirred vigorously. The insoluble product (which is the disulfate salt) is collected, washed three times with 3 ml. portions of ethanol and twice with 2.5 ml. portions of ether, and dried under reduced pressure. If further purification is desired, the product is dissolved in 1.5 ml. of water and reprecipitated by diluting to a volume of 40 ml. with cold ethanol and stirring vigorously. The product is collected on a filter, washed with ethanol and with ether, and dried under reduced pressure at 25° C. for 24 hours. It is $N^1$-(4-amino-2-hydroxybutyryl)-4-O-(2,6 - diamino - 2,6 - dideoxy-D-glucopyranosyl)-2-deoxystreptamine disulfate dihydrate (one molecule base, 2 molecules sulfuric acid, 2 molecules water). When heated it turns brown at 248° C. and turns black (decomposition) at 270–290° C. without melting. The specific rotation $[\alpha]_D^{25}$ (1% in water) at various wavelengths are as follows: +47.9° at 589 millimicrons; +49.6° at 578 millimicrons; +56.1° at 546 millimicrons; +91.2° at 436 millimicrons; and +134° at 365 millimicrons.

The dihydrate described above is converted to a monohydrate by drying it at reduced pressure at 100° C. for 24 hours.

$N^1$-(4-amino-2-hydroxybutyryl) - 4 - O - (2,6-diamino-2,6-dideoxy-D-glucopyranosyl)-2-deoxystreptamine is converted to phosphate, hydrochloride, citrate, maleate and p-toluenesulfonate salts by reacting it respectively with phosphoric acid hydrogen chloride, citric acid, maleic acid, and p-toluenesulfonic acid.

I claim:
1. A member of the class consisting of $N^1$-(4-amino-2-hydroxybutyryl) - 4 - O - (2,6-diamino-2,6-dideoxy-D-glucopyranosyl)-2-deoxystreptamine and pharmaceutically-acceptable acid-addition salts thereof.
2. A compound according to claim 1 in the form of the free base.
3. A compound according to claim 1 in the form of a pharmaceutically-acceptable acid-addition salt.
4. A compound according to claim 3 in the form of the disulfate.
5. A compound according to claim 3 in the form of the tetrahydrobromide.

References Cited
UNITED STATES PATENTS 3,221,009  11/1965  Yabuta et al. _____ 260—210 S
3,541,078  11/1970  Woo et al. _____ 260—210 R LEWIS GOTTS, Primary Examiner J. R. BROWN, Assistant Examiner U.S. Cl. X.R.

260—210 R; 424—180